US006763324B1

United States Patent
Pittman et al.

(10) Patent No.: US 6,763,324 B1
(45) Date of Patent: Jul. 13, 2004

(54) INTEGRATED ENGINEERING ANALYSIS PROCESS WITH SOLUTION FEEDBACK

(75) Inventors: Robert N. Pittman, Fairfield, OH (US); Scott J. Dennison, West Chester, OH (US); Kenneth E. Seitzer, Mason, OH (US); John D. Bibler, Mason, OH (US); Stephen P. Schrantz, West Chester, OH (US); John C. Blanton, West Chester, OH (US); Mir M. Ali, Mason, OH (US); Robert J. Maffeo, Cincinnati, OH (US); James C. Dudley, Cincinnati, OH (US); David M. Johnson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/534,677

(22) Filed: Mar. 24, 2000

(51) Int. Cl.[7] ............................................. G06F 17/10
(52) U.S. Cl. ......................... 703/2; 220/645; 700/270; 415/200
(58) Field of Search ............................... 703/2; 220/645; 700/270; 415/200

(56) References Cited

U.S. PATENT DOCUMENTS

| 5,343,407 A | * | 8/1994 | Beauford et al. | ............ 700/270 |
| 5,820,337 A | * | 10/1998 | Jackson et al. | .............. 415/200 |
| 6,510,961 B1 | * | 1/2003 | Head et al. | ................... 220/645 |

* cited by examiner

Primary Examiner—Kevin J. Teska
Assistant Examiner—Ed Garcia-Otero
(74) Attorney, Agent, or Firm—Cantor Colburn LLP

(57) ABSTRACT

An integrated engineering analysis system that determines at least one final output value in response to at least one initial input value. A first subprocesses provides at least one output value in response to the initial input value. A plurality of subprocesses provide a plurality of output values in response to the output values of the first subprocess. The plurality of output values and the output value of the first subprocess are inputted into at least one of the plurality of subprocesses. A command code executes each of the plurality of subprocesses in response to the output values and determines which one of the plurality of subprocesses to run and a final subprocess provides a final output. The final output is the result of a plurality of calculations executed by the plurality of subprocesses and the command code compares the final output with the initial input.

8 Claims, 2 Drawing Sheets

INTEGRATED ENGINEERING ANALYSIS PROCESS WITH SOLUTION FEEDBACK

BACKGROUND OF THE INVENTION

In highly complex engineering situations where the final product or design has a numerous amount of interrelated mechanical parts and/or functions, the engineering design process consists of a plurality of independent modeling problems wherein the solution of each of the modeling problems is determined by running a series of simulations or solving a series of problems whereby the solution of the first simulation and/or problem is inputted into the next simulation and/or problem until the variance between the last solution and the second to last solution is at a minimum and/or within predetermined tolerances.

However, and in design problems where there is a plurality of independent modeling scenarios and each of the inputs and/or outputs of the scenarios is related to or has a significant effect on the result of one or more of the other scenarios, the solution process is quite tedious and cumbersome.

For example, an ideal input for a fist simulation may result in an unacceptable result for a second simulation. Accordingly, and in situations where each of the modeling scenarios is run in a "stand alone" process, the simulations must be reexecuted until each one of the simulations results in an output which is within the predetermined tolerances of the design.

For example, in designing an aircraft engine, and for purposes of illustrating just one problem encountered in such a design, the reliability, weight, performance, and, ultimately, the life of rotating turbomachinery in an aircraft engine is inherently dependent upon the operating temperature distributions within the components of the machine. The determination of these operating temperatures is very complex. In order to determine these temperatures, the calculation of the values of many independent parameters which are the results of individual subprocesses themselves, must be determined.

BRIEF SUMMARY OF THE INVENTION

An exemplary embodiment of the invention is directed to an engineering analysis process for implementing a design. The design process utilizes a multiple of computer models that are executed by individual solver programs and/or subroutines. An executive code implements and manages the computer models as well as the feedback of the solution results from the computer models. The feedback is then inputted into the appropriate computer model for a more accurate design simulation whereby interrelated parameters for mechanical parts are accounted for.

Another exemplary embodiment of the present invention is a method for determining the interdependencies between separate subprocesess.

DETAILED DESCRIPTION OF THE INVENTION

Figure 1:
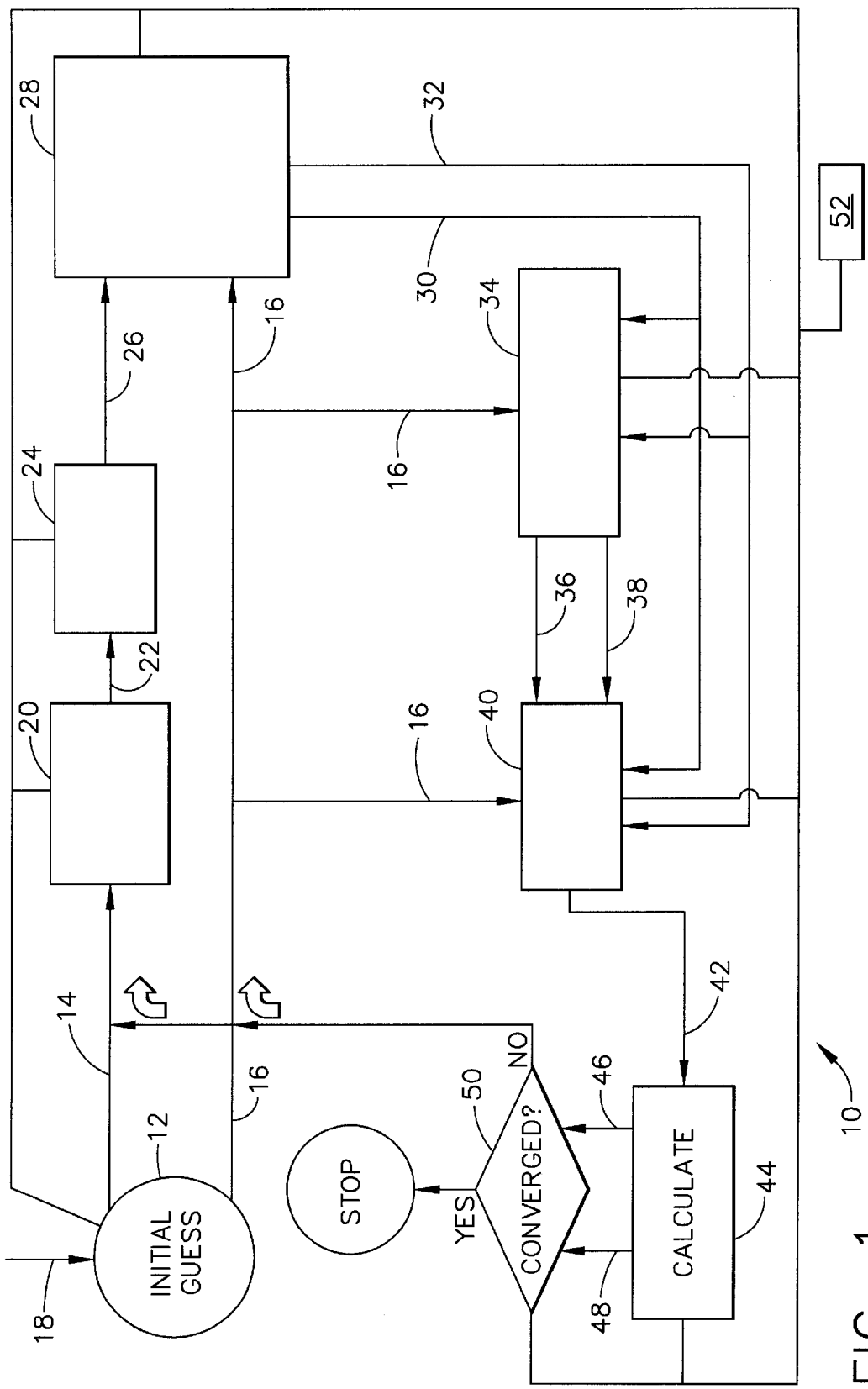
FIG. 1 is a block diagram of an integrated engineering analysis process in an exemplary embodiment of the invention.

Referring now to FIG. 1, an integrated engineering analysis process 10 with solution feedback is illustrated. An initial guess or estimate 12 provides a first initial value 14 and a second initial value 16. Initial estimate 12 determines values 14 and 16 in response to a first condition 18 which is either inputted into initial estimate 12 or is a component part of initial estimate 12 which determines initial values 14 and 16.

A first subprocess 20 receives a first initial value 14 and provides an output 22. Output 22 is dependent upon the value of first initial value 14. First subprocess 20 can be or include a computer algorithm which receives an input in the form of first initial value 14 and accordingly calculates output 22.

A second subprocess 24 receives output 22 and provides an output 26. Output 26 is dependent upon the value of output 22. Second subprocess 24 can be or include a computer algorithm which receives an input in the form of output 22 and accordingly calculates output 26.

A third subprocess 28 receives output 26 and second initial value 16 and provides outputs 30 and 32. Output 30 and 32 are dependent upon output 26 and second initial value 16. Third subprocess 28 can also be or include a computer algorithm that receives inputs in the form of output 26 and initial value 16 which in response to the values of the output 26 and value 16 provides outputs 30 and 32.

A fourth subprocess 34 receives second initial value 16 and outputs 30 and 32. Fourth subprocess 34 produces outputs 36 and 38. Outputs 36 and 38 are dependent upon second initial value 16 and outputs 30 and 32. In addition, fourth subprocess 34 can also be or include a computer algorithm that receives inputs in the form of initial value 16 and outputs 30 and 32. In response to these inputs fourth subprocess 34 calculates and provides outputs 36 and 38.

A fifth subprocess 40 receives second initial value 16 and outputs 30, 32, 36 and 38. Fifth subprocess 40 produces a final output 42. Final output 42 is dependent upon second initial value 16 and outputs 30, 32, 36 and 38. Similarly, fifth subprocess 40 can be or include a computer algorithm which in response to initial value 16 and outputs 30, 32, 36 and 38 calculates a final output 42.

Final output 42 is now inputted into a final subprocess 44. Final subprocess 44 produces outputs 46 and 48. Outputs 46 and 48 are dependent upon the value of final output 42. Final subprocess 44 can also be or include a computer algorithm which in response to the value of final output 42 calculates outputs 46 and 48. Outputs 46 and 48 correspond to initial values 14 and 16 respectively. For example, initial value 14 is determined by the initial estimation and output 46 is a value that is comparable to initial value 14, however, output 46 is determined by a series of calculations and integrated steps which are set in motion by initial values 14 and 16. Additionally, and for example, initial value 14 and output 46 can be temperature readings of a specific location and/or material. However, the value of output 46 may be significantly different than initial value 14 due to the fact that output 46 is dependent upon a series of integrated engineering calculations which are based in part upon initial value 14.

Outputs 46 and 48 are inputted into a decision node 50 which determines whether or not outputs 46 and 48 are sufficiently close to or converged with their respective initial input values 14 and 16. A range which represents a tolerance range that is acceptable between values 14 and 16 and outputs 46 and 48 can define the convergence of initial input values 14 and 16 to outputs 46 and 48.

If not, outputs 46 and 48 replace initial values 14 and 16 and engineering analysis process 10 is run again, however, outputs 46 and 48 are used instead of initial values 14 and 16. Engineering analysis process 10 is repeated until outputs 46 and 48 are determined to be at the desired value decision node 50. At this point, decision node 50 instructs engineering analysis process 10 to stop.

Since the process began with an initial assumption 18 it is almost certain that the first outputs 46 and 48 will not be within the predetermined tolerances.

As an alternative, and as required by the type of engineering analysis being performed, the number of subprocesses and their corresponding inputs and outputs may be varied.

A command code or module 52 communicates with each of the subprocesses and determines whether an input has been received and, accordingly, instructs the subprocess to run and provides designated output.

Accordingly, command code 52 determines which of the subprocesses to run and the sequence in which they are to be run. In addition, and as an alternative, command code 52 can be provided with boundary conditions, which set limits for each subprocess. Therefore, and if the result is outside the predetermined range, command code 52 will stop the analysis and request recalculation or new values to be inputted into the appropriate subprocess.

Integrated engineering analysis process 10 allows an engineer to run numerous simulations while varying the inputs in order to determine the effect on the final output. Attempting such a task in a situation where each of the subprocesses was a "stand alone" procedure would require many more calculations and comparisons which in comparison to the analysis process of instant application would be quite tedious and cumbersome, as well as involving a significant amount of additional time.

Figure 2:
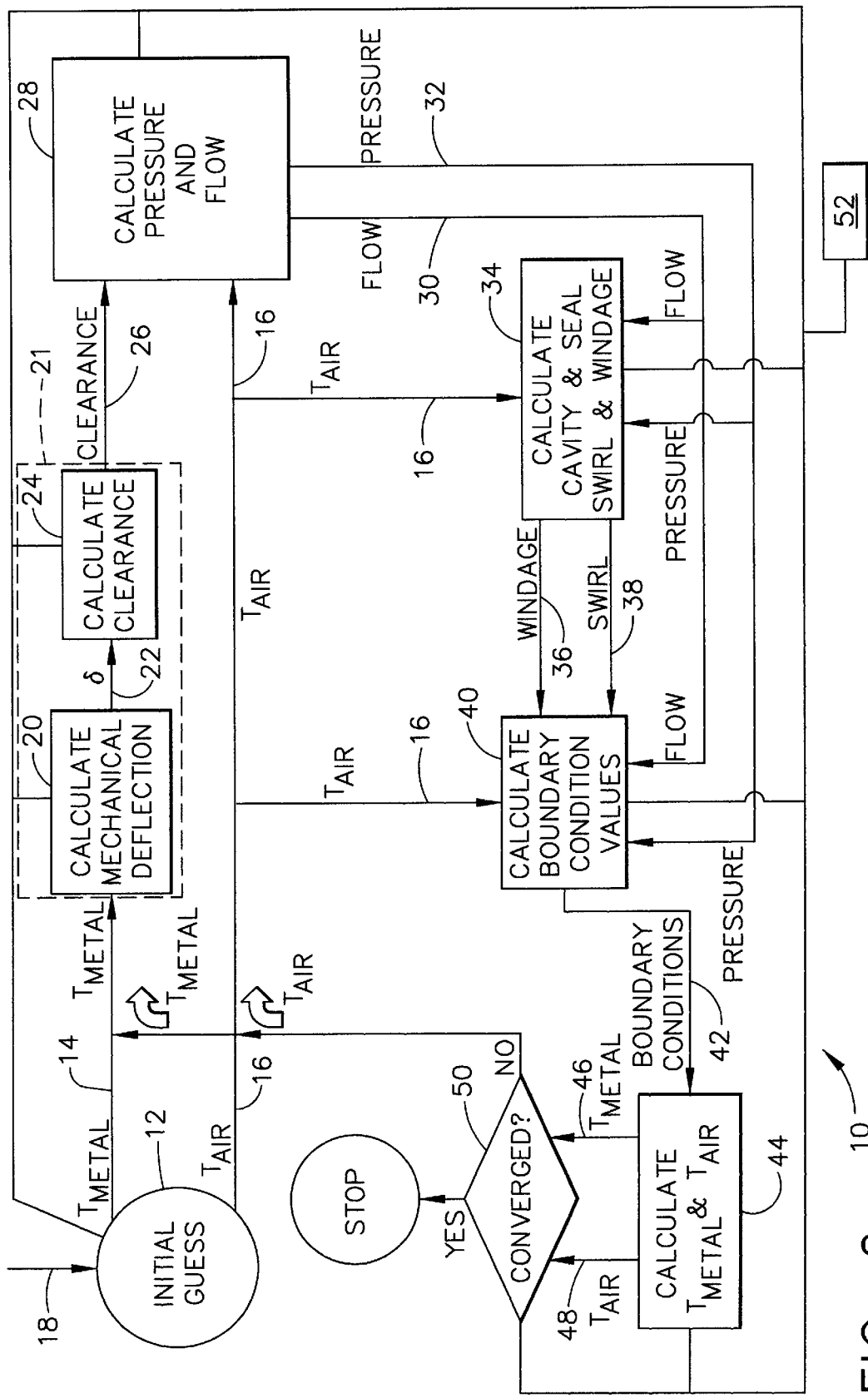
FIG. 2 is a block diagram of an intended use of the integrated engineering analysis process of FIG. 1.

One contemplated use of the present invention is an integrated engineering analysis process with solution feedback for an aircraft engine design. This embodiment is illustrated in FIG. 2. Here initial guess or assumption 12 calculates air and metal temperatures (14, 16) for component parts of an aircraft engine in response to an initial assumption 18.

The metal temperature 14 is inputted into subprocess 20, which calculates the mechanical deflection of the metal components of an aircraft engine in response to the metal temperature 14. In addition to the metal temperature, and as will be discussed in more detail below, the engine speed, cavity pressures, and other forces influence the mechanical deflection of the metal components (subroutines 24, 28, 34 and 40). Using these subroutines, and their outputs, the mechanical deflection of the metal components is calculated. These boundary conditions can be applied to a mechanical model 21 (illustrated by the dashed lines in FIG. 2) that calculates the mechanical deflection. The boundary conditions can be applied directly to mechanical model 21 directly as needed by the integrated engineering analysis process 10.

Mechanical model 21 may use the same mesh as integrated engineering analysis process 10 model. Using the same mesh avoids mapping metal temperatures from one mesh to another mesh. An added temperature mapping subprocess would increase the computation time required for integrated engineering analysis process 10. However, there are several potential differences between mechanical model 21 and analysis process 10 model. The mechanical model can be a subset of the analysis process 10 model. This limits the calculation of mechanical deflections to only the metal components to be used in clearance calculations (subprocess 24). The mechanical model can include both axisymmetric and plane stress elements. The mechanical model uses rigid connector elements to connect the different components of the assembly. The mechanical model should include point weights for 3-D features such as blades, bolts, and nuts. The mechanical model can include rotor and stator parts including components with different rotor speeds. Mechanical solver specific element tags are used for this purpose. Mechanical solver specific element tags are also used to account for bolthole stiffness reductions and to cut hoop physical properties for non-axisymmetric features. Special modeling techniques are used to represent the airfoils in the mechanical model.

Here output 22 of second subprocess 20 is the mechanical deflection value. It is noted, and for illustration purposes, that the mechanical deflection value 22 is dependent upon the temperature value 14 and other values such as engine speed and cavity pressures.

Output 22 is now inputted into subprocess 24 which in this embodiment calculates the resulting clearance between the mechanical parts (output 26). Again, and for purposes of illustration, it is noted that the clearance value is dependent upon the deflection value (output 22) of a mechanical part which in turn is dependent upon the metal temperature (initial value 14).

Output 26 and initial value 16 are now inputted into subprocess 28 which in this embodiment calculates flow and pressure values (outputs 30 and 32). Again, it is noted that the flow and pressure values are dependent upon the clearance and air temperature values.

Here it is of particular importance to note that output 26 is the result of three subprocesses (12, 20 and 24) while initial value 16 is the result of one subprocess 12.

As contemplated with the instant application integrated engineering analysis process 10 is able to provide outputs (30 and 32) that are dependent upon inputs having origins of differing complexity.

As contemplated in the instant application, integrated engineering analysis process 10 and, in particular, the subprocess 28 provides two outputs 30 and 32 which are dependent upon the input of outputs 26 and 16, one of which is a result of three independent calculations.

Accordingly, integrated engineering analysis process 10 provides a problem solving approach wherein multiple results of simulations and/or equations having interdependent characteristics are accounted for in the final solution.

Referring back now to FIG. 2, initial value 16 and outputs 30 and 32 are now inputted into subprocess 34 which in this embodiment calculates the cavity and seal windage and swirl values (outputs 36 and 38).

Finally, initial value 16 and outputs 30, 32, 36 and 38 are inputted into subprocess 40 which will calculate the boundary condition values (output 42). These boundary conditions are now inputted into subprocess 44 in order to calculate outputs 46 ($TF_{metal}$) and 48 ($T_{air}$). It is noted that outputs 46 and 48 are comparable to initial values 14 and 16 respectively.

Decision node 50 determines whether or not outputs 46 and 48 are within predetermined tolerances. If so, the process is stopped, however, on the other hand if outputs 46 and 48 are not within the predetermined tolerances they are inputted into continuing analysis process 10 in place of initial values 14 and 16 and even tighter speculation is rerun with outputs 46 and 48 as the initial values. Therefore, the subprocesses of integrated and engineering analysis 10, dependent upon the prior outputs 46 and 48, will calculate a new set of outputs 46 and 48.

It is noted that in this embodiment the calculation of output values of many independent parameters are determined by an integrated manner which provides feedback among the various parameters or subprocesses so that all of the interdependencies are represented in the calculation of each of the values.

For example, and referring in particular to FIG. 2 which references an aircraft engine design problem, it is noted that the temperatures, and accordingly, the resulting values dependent upon these temperatures, will vary significantly as the engine moves from a non-operating temperature to an operational temperature.

Integrated engineering analysis process 10 in one embodiment provides a process for calculating the temperatures of components of turbomachinery. This process combines the calculation of metal temperatures with the calculation of cooling flow rates and temperatures including, the interdependent aspects of these physical processes. For example, the calculation of metal temperatures is combined with the calculation of cooling flow rates and temperatures and pressures and also the calculations of mechanical deflection as well as the interdependent aspects of these processes. These processes may also include the calculation of mechanical deflection of both a rotating feature and a stationary feature at a flow restriction. In addition, logic simulating control system regulation of controllable engine devices can also be incorporated into the calculation.

Thus, an integrated automatic, real-time process for thermal analysis, flow analysis, cavity (windage and swirl) analysis, labyrinth seal analysis, mechanical deflection analysis, and clearance analysis is provided. Moreover, there is communication between the various elements in the integrated process of the instant application. In addition, and as an alternative, the hierarchy of integrated analysis process 10 can be altered to accommodate various design features and/or scenarios.

Moreover, these temperatures will vary as the engine is exposed to differing altitudes and weather conditions. Therefore, the analysis process of the instant application allows a designer to predict such variations as the analysis process of the instant application accounts for such interdependencies which, in turn, allows the design to account for such variations.

It is also contemplated that, in accordance with the present invention, the number of subprocesses may be increased or decreased. In addition, the output and accordingly input pathways to and from each of the subprocesses may also be varied. Moreover, the number of output and input pathways may also be varied.

Of course, the number of subprocesses and their interconnections is dependent upon the type of engineering analysis process being performed. For example, the instant application discusses one aspect of an aircraft engineering analysis process, however, the process of the instant application is not intended to be limited to the same and may be utilized with any design process.

The integrated engineering analysis of the instant application provides accurate accounting and representation of the interdependent values. This results in high-quality predictions. For example, steady-state and transient temperature levels and distributions vary significantly and are dependent upon other values. The process of the instant application provides accurate predictions of the same which allows multiple interdependent outputs to be determined without having to rely on traditional "stand alone" calculations.

This process provides a more streamlined analysis technique which permits more cases, scenarios or problems to be analyzed in less time and at less cost.

There is also less opportunity for errors or miscalculations as the results of the various subprocesses are accounted for when calculating single values which in themselves vary.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for providing an integrated engineering analysis process with solution feedback for an aircraft engine design, comprising:

providing a first subprocess, said first subprocess comprises a computer algorithm which provides a first output in response to an input in the form of a first initial value, said first output being dependent upon said first initial value, wherein said first initial value is a metal temperature and said first subprocess calculates the mechanical deflection of metal components of the aircraft engine design in response to said first initial value;

providing a second subprocess, said second subprocess comprises a computer algorithm which provides a second output in response to an input in the form of said first output from said first subprocess, said second output being dependent upon said first output, wherein said first output is the mechanical deflection of the metal components of the aircraft engine design calculated in response to said first initial value and said second output is a clearance value of the metal components whose deflection is calculated in first subprocess;

providing a third subprocess, said third subprocess comprises a computer algorithm which provides a third output in response to an input in the form of said second output from said second subprocess and an input in the form of a second initial value, said third output being dependent upon said second initial value and said second output and comprises a pair of outputs, wherein said second initial value is an air temperature and said pair of outputs are flow and pressure values that are dependant upon the clearance values of the metal components and the air temperature of said second initial value;

providing a fourth subprocess, said fourth subprocess comprises a computer algorithm which provides a fourth output in response to an input in the form of said second initial value and said third output, said fourth output being dependent upon said second initial value and said third output and comprises a pair of outputs one of said pair of outputs is a cavity and seat windage value of the aircraft engine design and the other is a cavity and swirl value of the aircraft engine design;

providing a fifth subprocess, said fifth subprocess comprises a computer algorithm which provides a final output in response to an input in the form of said second initial value, said third output and said fourth output, said final output being dependent upon said second initial value, said third output and said fourth output, wherein said final output comprises boundary conditions corresponding to said second initial value, said third output and said fourth output;

providing a final subprocess, said final subprocess comprises a computer algorithm which provides a pair of outputs in response to an input in the form of said final output, one of said pair of outputs being of a unit comparable to said first initial value and the other one of said pair of outputs being of a unit comparable to said second initial value; and comparing said pair of outputs of said final subprocess to said first initial value and said second initial value to determine if said pair of outputs are within a predetermined range.

2. The method as in claim 1, wherein said predetermined range is a range which represents a tolerance range that is acceptable between said first initial value and said second initial value and said pair of outputs of said final subprocess.

3. The method as in claim 1, further comprising a command code for operating said first subprocess, said second subprocess, said third subprocess, said fourth subprocess, said fifth subprocess and said final subprocess wherein said command code determines if an input has been received by said first subprocess, said second subprocess, said third subprocess, said fourth subprocess, said fifth subprocess and said final subprocess and instructs which subprocess to run.

4. The method as in claim 3, wherein said command code is provided with a set of boundary conditions for each of the subprocesses and if any of the subprocesses provides an output outside of said set of boundary conditions the command code will stop the integrated engineering analysis process and request a new input to be provided into the appropriate subprocess.

5. The method as in claim 4, wherein said command code implements and manages the computer algorithms as well as feedback of said first output, said second output, said third output, said fourth output, said fifth output and said final output.

6. The method as in claim 5, wherein each computer algorithm of said first subprocess, said second subprocess, said third subprocess, said fourth subprocess, said fifth subprocess and said final subprocess comprises at least one computer model that is executed by individual solver programs and/or subroutines.

7. The method as in claim 6, wherein said executive code implements and manages the computer models.

8. The method as in claim 7, wherein the command code determines interdependencies between said first subprocess, said second subprocess, said third subprocess, said fourth subprocess and said fifth subprocess.

* * * * *